US012645566B2

(12) United States Patent
Casella et al.

(10) Patent No.: US 12,645,566 B2
(45) Date of Patent: Jun. 2, 2026

(54) VIEW-BASED BREAKPOINTS FOR A DISPLAY SYSTEM

(71) Applicant: Apple Inc., Cupertino, CA (US)

(72) Inventors: Tyler L. Casella, San Jose, CA (US); Norman N. Wang, Saratoga, CA (US); Benjamin Breckin Loggins, Santa Clara, CA (US); Daniel M. Delwood, San Jose, CA (US)

( * ) Notice: Subject to any disclaimer, the term of this patent is extended or adjusted under 35 U.S.C. 154(b) by 531 days.

(21) Appl. No.: 17/203,681

(22) Filed: Mar. 16, 2021

(65) Prior Publication Data

US 2021/0286701 A1 Sep. 16, 2021

Related U.S. Application Data

(63) Continuation of application No. 17/131,725, filed on Dec. 22, 2020, now abandoned, which is a
(Continued)

(51) Int. Cl.
*G06F 11/362* (2025.01)
*G02B 27/01* (2006.01)
(Continued)

(52) U.S. Cl.
CPC .......... *G06F 11/362* (2013.01); *G02B 27/017* (2013.01); *G06F 11/3698* (2025.01); *G06T 15/06* (2013.01); *G06T 19/006* (2013.01)

(58) Field of Classification Search
CPC . G06F 11/362; G06F 11/3664; G02B 27/017; G06T 15/06; G06T 19/006
See application file for complete search history.

(56) References Cited

U.S. PATENT DOCUMENTS 9,436,583 B1 * 9/2016 Chen .................... G06F 11/1479
10,120,779 B1 * 11/2018 Leung .................... G06F 11/362
(Continued)

FOREIGN PATENT DOCUMENTS

CN 106462488 A 2/2017
CN 106462743 A 2/2017
(Continued)

OTHER PUBLICATIONS

Allen Bierbaum et al., "Automated testing of virtual reality application interfaces," May 22, 2003 [retrieved Aug. 23, 2025], EGVE '03: Proceedings of the workshop on Virtual environments, pp. 107-114, downloaded from <url>: https://dl.acm.org/doi/abs/10.1145/769953.769966. (Year: 2003).*
(Continued)

*Primary Examiner* — S. Sough
*Assistant Examiner* — Stephen D Berman
(74) *Attorney, Agent, or Firm* — Young Basile Hanlon & MacFarlane, P.C.

(57) ABSTRACT

Systems and methods for simulated reality view-based breakpoints are described. Some implementations may include accessing motion data captured using one or more motion sensors; determining, based at least on the motion data, a view within a simulated reality environment presented using a head-mounted display; detecting that the view is a member of a set of views associated with a breakpoint; based at least on the view being a member of the set of views, triggering the breakpoint; responsive to the breakpoint being triggered, performing a debug action associated with the breakpoint; and, while performing the debug action, continuing to execute a simulation process of the simulated reality environment to enable a state of at least one virtual object in the simulated reality environment to continue to evolve and be viewed with the head-mounted display.

20 Claims, 9 Drawing Sheets

Related U.S. Application Data continuation of application No. PCT/US2019/038919, filed on Jun. 25, 2019.

(60) Provisional application No. 62/690,012, filed on Jun. 26, 2018.

(51) Int. Cl.

| | | |
|---|---|---|
| *G06F 11/3698* | (2025.01) | |
| *G06T 15/06* | (2011.01) | |
| *G06T 19/00* | (2011.01) | |

(56) References Cited

U.S. PATENT DOCUMENTS

| | | | | |
|---|---|---|---|---|
| 10,416,760 | B2 * | 9/2019 | Burns | G06F 3/011 |
| 10,802,852 | B1 * | 10/2020 | Wilmot | G06F 9/455 |
| 2004/0128655 | A1 * | 7/2004 | Bates | G06F 11/3698 |
| | | | | 717/125 |
| 2009/0094225 | A1 * | 4/2009 | Cradick | G06F 16/951 |
| | | | | 707/999.005 |
| 2009/0100353 | A1 * | 4/2009 | Cradick | A63F 13/12 |
| | | | | 715/757 |
| 2009/0178030 | A1 * | 7/2009 | Golan | G06F 11/362 |
| | | | | 717/129 |
| 2013/0218542 | A1 | 8/2013 | Yerli | |
| 2013/0247007 | A1 | 9/2013 | Fuhrer et al. | |
| 2015/0217198 | A1 * | 8/2015 | Curtis | A63F 13/32 |
| | | | | 463/31 |
| 2015/0324568 | A1 | 11/2015 | Publicover et al. | |
| 2015/0347274 | A1 | 12/2015 | Taylor et al. | |
| 2016/0027216 | A1 * | 1/2016 | da Veiga | G06F 3/013 |
| | | | | 345/158 |
| 2016/0027218 | A1 * | 1/2016 | Salter | G02B 27/0093 |
| | | | | 345/633 |
| 2016/0063766 | A1 * | 3/2016 | Han | G06F 3/013 |
| | | | | 345/633 |
| 2016/0124835 | A1 * | 5/2016 | Davis | G06F 11/3698 |
| | | | | 714/38.1 |
| 2017/0039045 | A1 | 2/2017 | Abrahami et al. | |
| 2017/0109933 | A1 * | 4/2017 | Voorhees | G06F 11/36 |
| 2018/0005444 | A1 | 1/2018 | Mullins | |
| 2018/0101986 | A1 * | 4/2018 | Burns | G06T 19/006 |
| 2018/0107585 | A1 * | 4/2018 | Ramesh | G06F 8/443 |
| 2018/0120928 | A1 * | 5/2018 | Hayashida | G06F 3/011 |
| 2018/0210813 | A1 * | 7/2018 | Barsness | G06F 11/3612 |

FOREIGN PATENT DOCUMENTS

| | | |
|---|---|---|
| CN | 107850936 A | 3/2018 |
| WO | 2017066512 A1 | 4/2017 |

OTHER PUBLICATIONS

Andre Alexandre Wang Liu, "3D Application Debugging," Nov. 12, 2014, pp. 1-118, downloaded from <url>:https://webarchive.di.uminho.pt/mei.di.uminho.pt/mei.di.uminho.pt/sites/default/files/dissertacoes/eeum_di_dissertacao_pg22841.pdf. (Year: 2014).*

Rick Chern et al., "Debugging with control-flow breakpoints," Mar. 14, 2007, AOSD '07: Proceedings of the 6th international conference on Aspect-oriented software development, pp. 96-106, downloaded from <url>:https://dl.acm.org/doi/abs/10.1145/1218563.1218575. (Year: 2007).*

Sa Wang et al., "A New Method of Virtual Reality Based on Unity3D", 2010 [retrieved Dec. 27, 2025], 18th International Conference on Geoinformatics, pp. 1-5, downloaded from <url>:https://ieeexplore.IEEE.org/abstract/document/5567608. (Year: 2010).*

International Search Report and Written Opinion dated Aug. 30, 2019 in co-pending International Application No. PCT/US2019/038919 (16 pp).

TREND3r, "Portfolio Archives: Virtual Reality", Home, Portfolio Project, Feb. 2018, https://trend3r.com/project-category/vr/ (3 pp).

Loverde, J., et al., "Add Unity 5.3 Vuforia 6 scene to existing nature iOS 9 (Xcode 8.1)", Vuforia Developer Portal, Nov. 2016, https://developer.vuforia.com/forum/unity-extension-technical-discussion/add-unity-53-vuforia-5-scene-existing-native-ios-9-xcode-7 (3 pp).

TREND3r, "Portfolio Archives: Augmented Reality", Home, Portfolio Project, Jul. 2017, https://trend3r.com/project-category/ar/ (2 pp).

Chiara, "Geometric Breakpoints", Live Architectures, Augmented Reality video installation composed by diverse fresco-points, 2015, http://www.chiarapassa.it/GeometricBreakpoints.html (2 pp).

Github, "unityvuforiaplayback", Jul. 2015, https://github.com/thirunar/unityvuforiaplayback/blob/master/unityvuforiaplayback.userprefs (2 pp).

Wulongtiantang, "Unity3D Debug Breakpoints", Setting Breakpoints in Unity, VS2022—CSDN Blog, Published on Oct. 22, 2013, downloaded Nov. 25, 2025, https://blog.csdn.net/wulongtiantang/article/details/12953507 Machine Translated (6 pp).

* cited by examiner

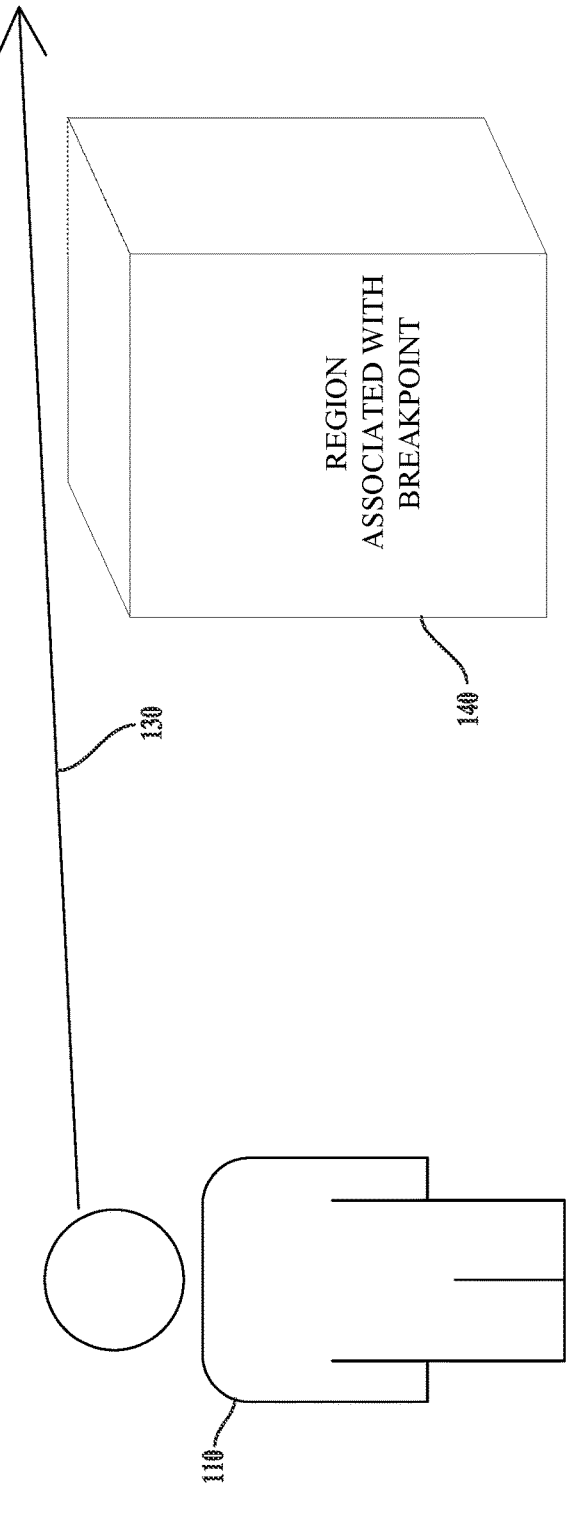
REGION ASSOCIATED WITH BREAKPOINT
100
130
140
110
FIG. 1

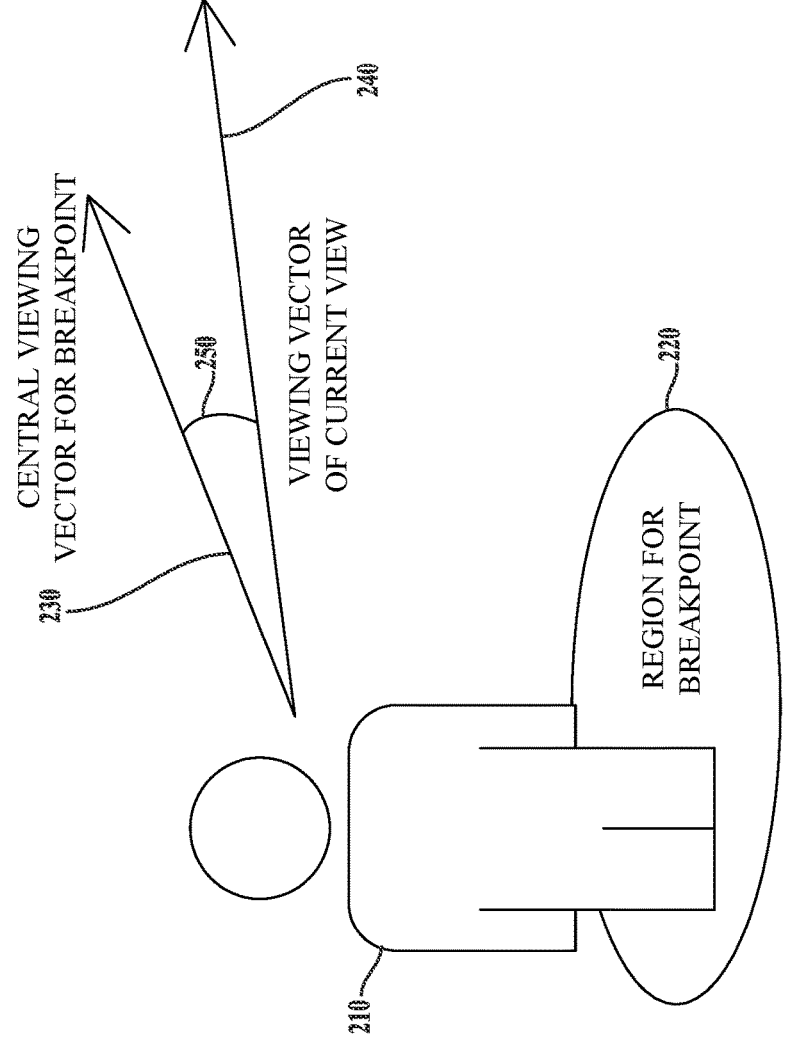
CENTRAL VIEWING
VECTOR FOR BREAKPOINT
VIEWING VECTOR
OF CURRENT VIEW
230
250
240
REGION FOR
BREAKPOINT
220
210
200
FIG. 2

300
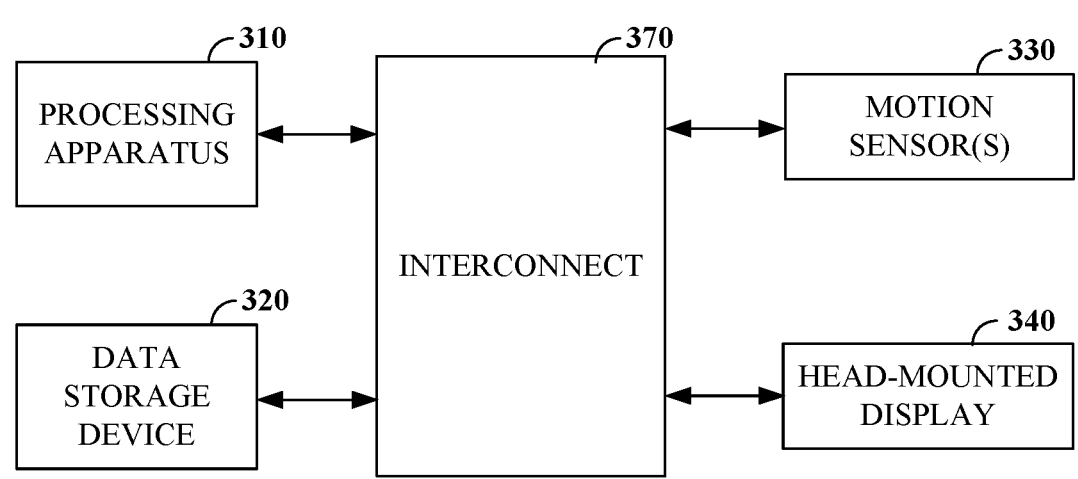
FIG. 3

400

600

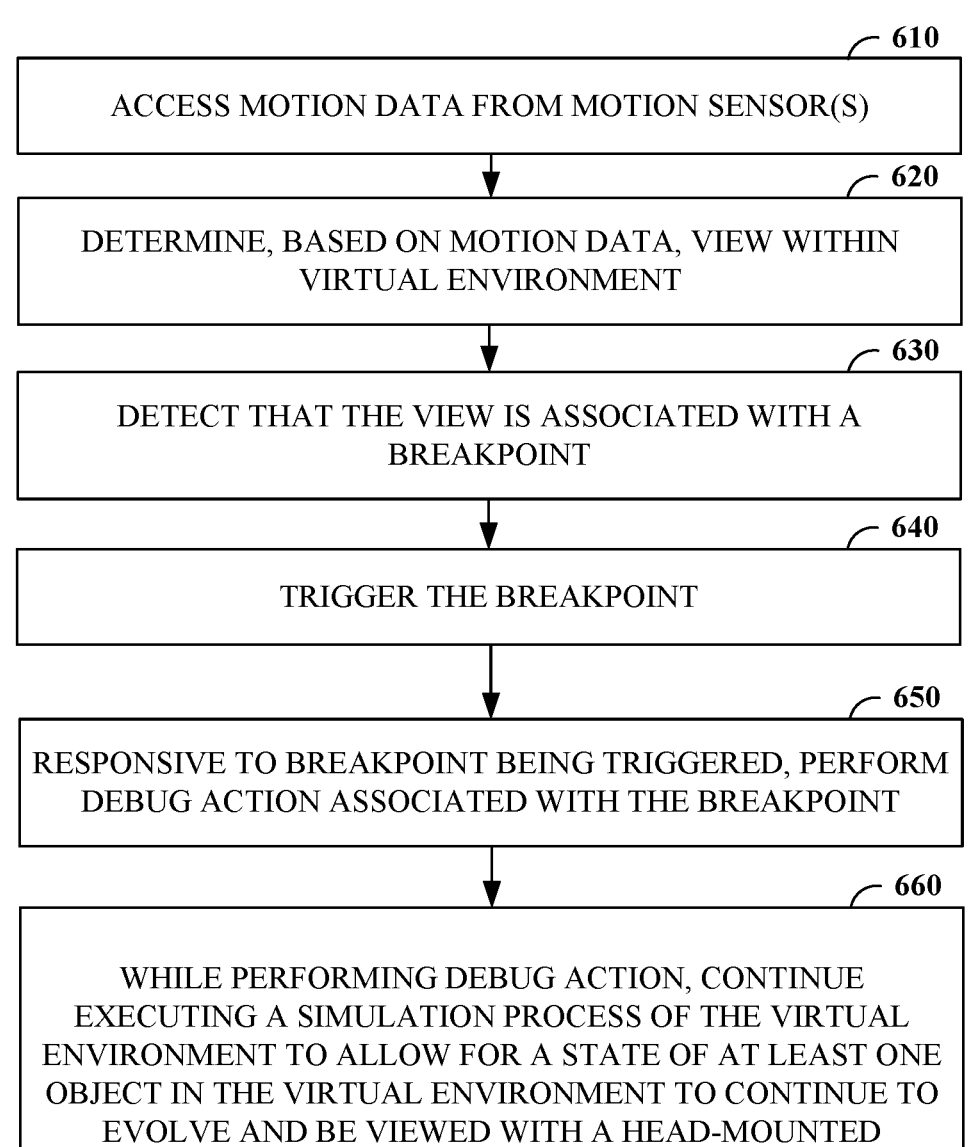

610

ACCESS MOTION DATA FROM MOTION SENSOR(S)

620

DETERMINE, BASED ON MOTION DATA, VIEW WITHIN VIRTUAL ENVIRONMENT

630

DETECT THAT THE VIEW IS ASSOCIATED WITH A BREAKPOINT

640

TRIGGER THE BREAKPOINT

650

RESPONSIVE TO BREAKPOINT BEING TRIGGERED, PERFORM DEBUG ACTION ASSOCIATED WITH THE BREAKPOINT

660

WHILE PERFORMING DEBUG ACTION, CONTINUE EXECUTING A SIMULATION PROCESS OF THE VIRTUAL ENVIRONMENT TO ALLOW FOR A STATE OF AT LEAST ONE OBJECT IN THE VIRTUAL ENVIRONMENT TO CONTINUE TO EVOLVE AND BE VIEWED WITH A HEAD-MOUNTED DISPLAY

DETERMINE WHETHER A POSITION OF THE VIEW IS WITHIN A REGION OF THE SET OF VIEWS

720

DETERMINE AN ANGLE BETWEEN A VIEWING VECTOR OF THE VIEW AND A CENTRAL VIEWING VECTOR OF THE SET OF VIEWS

730

DETERMINE WHETHER THE ANGLE IS WITHIN A RANGE OF ANGLES OF THE SET OF VIEWS

800

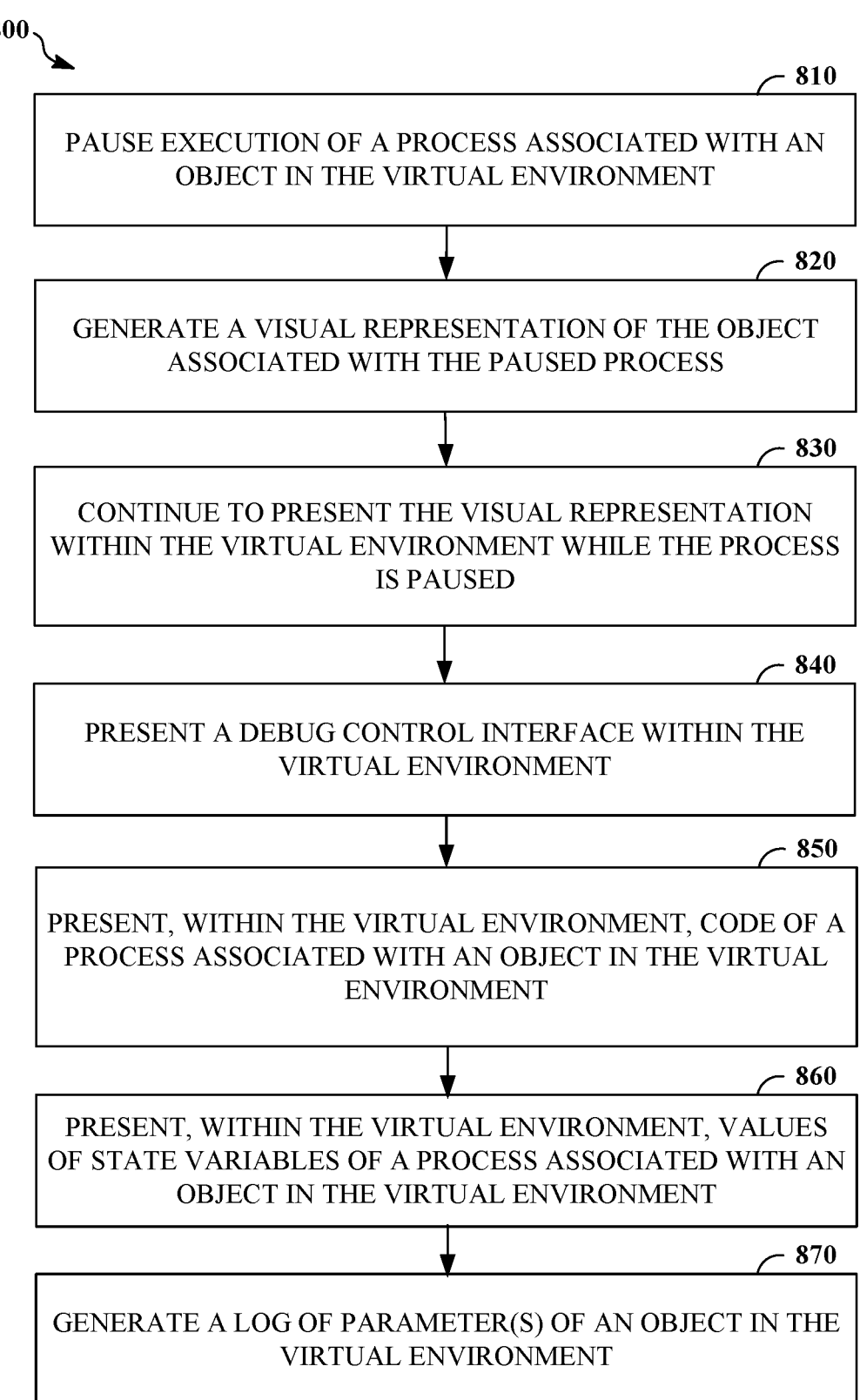

810

PAUSE EXECUTION OF A PROCESS ASSOCIATED WITH AN OBJECT IN THE VIRTUAL ENVIRONMENT

820

GENERATE A VISUAL REPRESENTATION OF THE OBJECT ASSOCIATED WITH THE PAUSED PROCESS

830

CONTINUE TO PRESENT THE VISUAL REPRESENTATION WITHIN THE VIRTUAL ENVIRONMENT WHILE THE PROCESS IS PAUSED

840

PRESENT A DEBUG CONTROL INTERFACE WITHIN THE VIRTUAL ENVIRONMENT

850

PRESENT, WITHIN THE VIRTUAL ENVIRONMENT, CODE OF A PROCESS ASSOCIATED WITH AN OBJECT IN THE VIRTUAL ENVIRONMENT

860

PRESENT, WITHIN THE VIRTUAL ENVIRONMENT, VALUES OF STATE VARIABLES OF A PROCESS ASSOCIATED WITH AN OBJECT IN THE VIRTUAL ENVIRONMENT

870

GENERATE A LOG OF PARAMETER(S) OF AN OBJECT IN THE VIRTUAL ENVIRONMENT

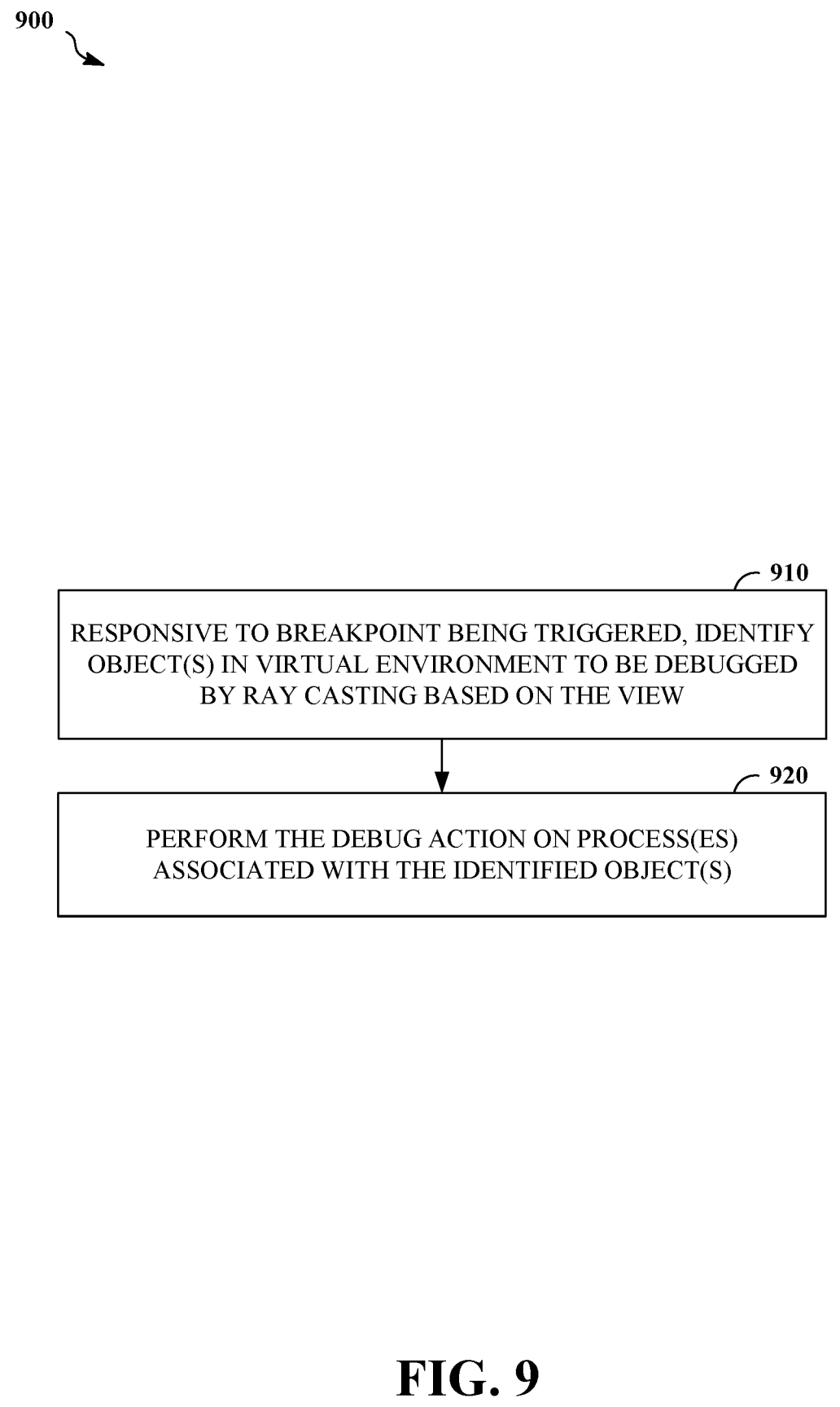

RESPONSIVE TO BREAKPOINT BEING TRIGGERED, IDENTIFY OBJECT(S) IN VIRTUAL ENVIRONMENT TO BE DEBUGGED BY RAY CASTING BASED ON THE VIEW

920

PERFORM THE DEBUG ACTION ON PROCESS(ES) ASSOCIATED WITH THE IDENTIFIED OBJECT(S)

FIG. 9

VIEW-BASED BREAKPOINTS FOR A DISPLAY SYSTEM

CROSS-REFERENCE TO RELATED APPLICATIONS

This application is a continuation of U.S. patent application Ser. No. 17/131,725, filed Dec. 22, 2020, entitled "Mixed Reality View-Based Breakpoints," which is a continuation of PCT Application No. US2019/038919, filed Jun. 25, 2019, entitled "View-Based Breakpoints," which claims the benefit of U.S. Provisional Application No. 62/690,012, filed on Jun. 26, 2018, entitled "Mixed Reality View-Based Breakpoints," the contents of which are incorporated herein by reference in its entirety for all purposes.

TECHNICAL FIELD

This disclosure relates to simulated reality view-based breakpoints.

BACKGROUND

Head-mounted displays are used to provide virtual reality, augmented reality, and/or simulated reality experiences for users. Debugging tools are used by software developers to track down and identify errors-often called "bugs"-in computer instruction code. Debugging tools allow developers to specify breakpoints for a piece of software code, usually by specifying a line of the code as being associated with a breakpoint. When a condition for the breakpoint occurs (e.g., a specified line of code is reached during execution of the software), then the debugging tool may trigger an action, such as pausing execution of the software at a specified line of code and/or presenting a software developer with a debugging interface that facilitates the examination of the paused state of the software and/or the controlled execution (e.g., stepping through the code one line at a time with pauses between lines) of the software.

SUMMARY

Disclosed herein are implementations of simulated reality view-based breakpoints.

In a first aspect, the subject matter described in this specification can be embodied in systems that include a head-mounted display and one or more motion sensors attached to the head-mounted display. The systems include a processing apparatus configured to access motion data captured using the one or more motion sensors; determine, based at least on the motion data, a view within a simulated reality environment presented using the head-mounted display; detect whether the view is associated with a breakpoint; based at least on detecting that the view is associated with the breakpoint, trigger the breakpoint and perform a debug action associated with the breakpoint; and, while performing the debug action, continue executing a simulation process of the simulated reality environment to enable a state of at least one virtual object in the simulated reality environment to continue to be viewed with the head-mounted display and respond to input received using the one or more motion sensors.

In a second aspect, the subject matter described in this specification can be embodied in methods that include accessing motion data captured using one or more motion sensors; determining, based at least on the motion data, a view within a simulated reality environment presented using a head-mounted display; detecting that the view is a member of a set of views associated with a breakpoint; based at least on the view being a member of the set of views, triggering the breakpoint; responsive to the breakpoint being triggered, performing a debug action associated with the breakpoint; and, while performing the debug action, continuing to execute a simulation process of the simulated reality environment to enable a state of at least one virtual object in the simulated reality environment to continue to evolve and be viewed with the head-mounted display.

In a third aspect, the subject matter described in this specification can be embodied in systems that include a head-mounted display. The systems include a processing apparatus configured to determine a view within a simulated reality environment presented using the head-mounted display; detect that the view is a member of a set of views associated with a breakpoint; based at least on the view being a member of the set of views, trigger the breakpoint; responsive to the breakpoint being triggered, perform a debug action associated with the breakpoint; and, while performing the debug action, continue executing a simulation process of the simulated reality environment to enable a state of at least one virtual object in the simulated reality environment to continue to evolve and be viewed with the head-mounted display.

In a fourth aspect, the subject matter described in this specification can be embodied in a non-transitory computer-readable storage medium. The non-transitory computer-readable storage medium may include executable instructions that, when executed by a processor, facilitate performance of operations, including accessing motion data captured using one or more motion sensors; determining, based at least on the motion data, a view within a simulated reality environment presented using a head-mounted display; detecting whether the view is associated with a breakpoint; based at least on detecting that the view is associated with the breakpoint, triggering the breakpoint; responsive to the breakpoint being triggered, performing a debug action associated with the breakpoint; and, while performing the debug action, continuing to execute a simulation process of the simulated reality environment to enable a state of at least one virtual object in the simulated reality environment to continue to evolve and be viewed with the head-mounted display.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIG. 1 is an illustration of an example of a view-based breakpoint usage scenario in an augmented reality space.

FIG. 2 is an illustration of an example of a view-based breakpoint usage scenario in a virtual reality space.

FIG. 3 is a block diagram of an example of a system configured to enable view-based breakpoints in a simulated reality application.

FIG. 6 is a flowchart of an example of a technique for enabling a view-based breakpoint.

FIG. 8 is a flowchart of an example of a technique for performing debug actions responsive to a breakpoint being triggered.

FIG. 9 is a flowchart of an example of a technique for identifying one or more virtual objects to debug responsive to a breakpoint being triggered.

DETAILED DESCRIPTION

Figure 4:
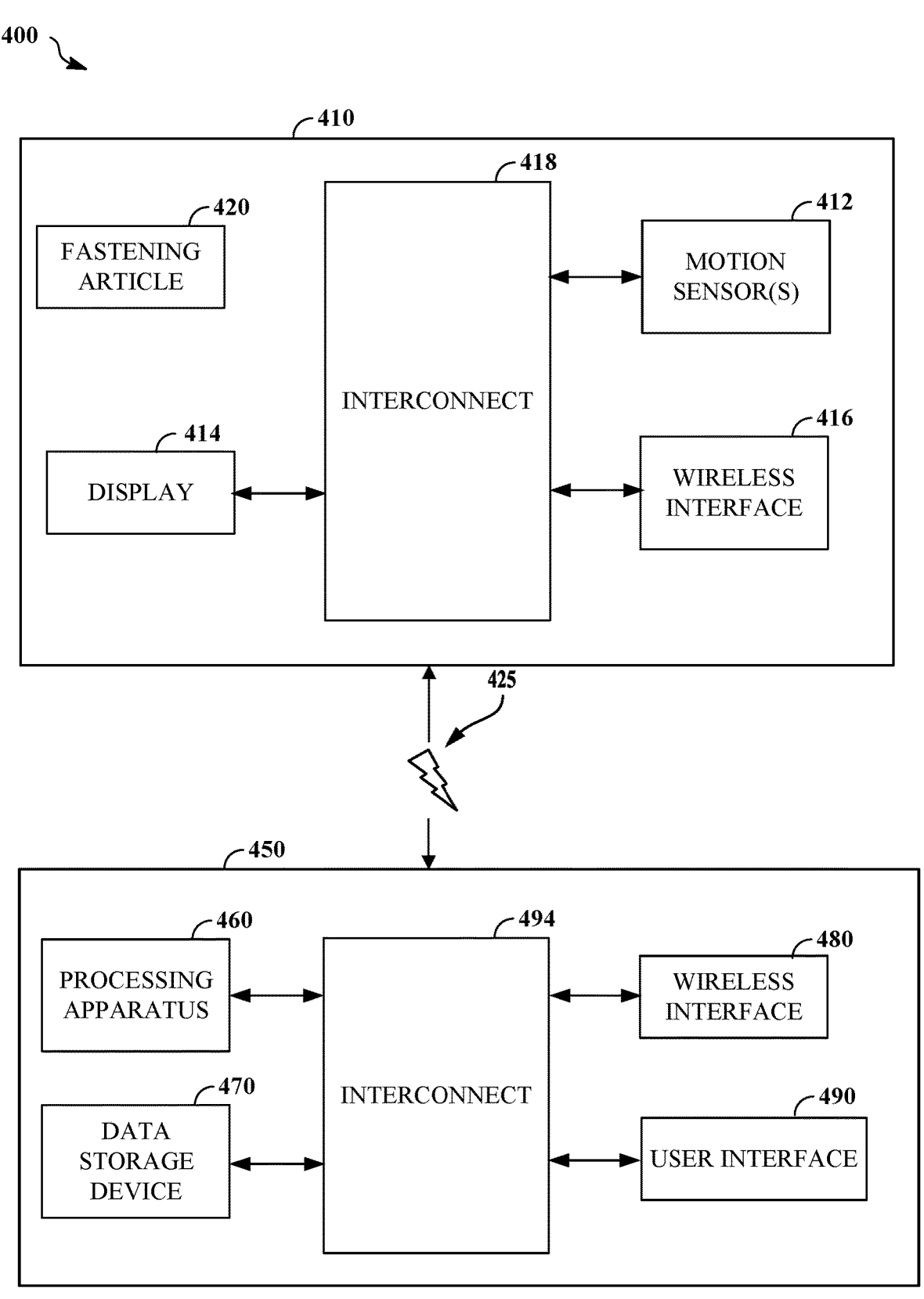
FIG. 4 is a block diagram of an example of a system configured to enable view-based breakpoints in a simulated reality application.

Breakpoints can be placed or otherwise associated with a line of code of an application, which causes execution of the application to pause upon encountering the line of code, allowing a software developer to step through lines of code to facilitate identification and removal of errors in the code.

View-based breakpoints may be implemented for debugging a simulated reality application. Users are able to specify a set of views (e.g., in terms of a range of positions and/or orientations of a virtual camera) of a simulated reality environment presented by the simulated reality application that will trigger a breakpoint. This may be useful, for example, when developers encounter bugs or visual artifacts from certain vantage points within the simulated reality environment of a simulated reality application and want to step through their code to see what is causing the problems. For example, users may set a position and area in a three-dimensional space of the simulated reality environment, in addition to a line of code, and the breakpoint may be triggered when both the line of code is reached during execution and the view presented to the user is within the specified set of views associated with the breakpoint.

View-based breakpoints may offer significant advantages over traditional debugging tools for simulated reality applications. With traditional breakpoints, this debugging task may be significantly more difficult, because, for example, the developer may need to keep their head still when creating a breakpoint to ensure that the code is running from the correct vantage point that is of interest. For example, application development time may be reduced, and/or the failure rate of resulting simulated reality applications may be reduced.

Physical Setting a. A physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste.

Simulated Reality a. In contrast, a simulated reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, a SR system may detect an individual walking a few paces forward and, responsive thereto, adjust graphics and audio presented to the individual in a manner similar to how such scenery and sounds would change in a physical setting. Modifications to attribute(s) of virtual object(s) in a SR setting also may be made responsive to representations of movement (e.g., audio instructions).

b. An individual may interact with and/or sense a SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

Virtual Reality a. One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Mixed Reality a. Another example of SR is mixed reality (MR). A MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

b. In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationery with respect to a physical building.

c. Augmented reality i. One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

ii. An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

d. Augmented virtuality i. Another example of mixed reality is augmented virtuality (AV). An AV setting refers to a simulated setting in which a computer-created or virtual setting incorporates at least one sensory input from the physical setting.

The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Hardware

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

FIG. 1 is an illustration of an example of a view-based breakpoint usage scenario 100 in an augmented reality space. A user 110 is wearing a head-mounted display and is able to turn their head to adjust their view of a simulated reality environment that includes virtual objects overlaid on a physical environment in which the user is standing. The direction of the user's view in the simulated reality environment may correspond to a ray 130 (e.g., a ray projecting through the center of the view). A set of views associated with a breakpoint may correspond to a region 140 in the simulated reality environment. The region 140 is a portion of the simulated reality environment that is associated with a breakpoint. In this example, the region 140 is a cube, but other shapes (e.g., a sphere or an irregular shape) for a region may be specified. For example, a virtual object of interest to a developer may be located within the region 140. In some implementations, the region 140 may be specified as centered at a virtual object. In some implementations, the region 140 may be specified as the volume of a virtual object.

For example, a breakpoint may be conditioned, in whole or in part, on the view of the user 110 intersecting significantly with the region 140 associated with the breakpoint. In some implementations, a condition of the breakpoint may be specified as the ray 130 of the view passing through the region 140. For example, determining whether the view of the user 110 satisfies the condition of the breakpoint may include determining whether the ray 130 of the view passes through the region 140. When the ray 130 passes through the region 140 and the view-based condition is satisfied, the breakpoint may be triggered if the view-based condition is the sole condition for the breakpoint or if the other conditions (e.g., reaching a designated line of code, a condition on the state of a virtual object, or user input) for the breakpoint are also satisfied. Once the breakpoint is triggered, one or more debug actions may be performed, such as pausing execution of a process associated with a virtual object and/or presenting a debug interface to the user 110 using the head-mounted display.

In some implementations (not shown in FIG. 1), the ray 130 may be expanded (e.g., from a ray to a cone centered on the ray) to provide more of a margin for detecting this view-based condition. The region 140 may have a non-zero volume in the simulated reality environment. In some implementations (not shown in FIG. 1), the ray 130 may be expanded and the region 140 may be collapsed to a point in the simulated reality environment.

FIG. 2 is an illustration of an example of a view-based breakpoint usage scenario 200 in a virtual reality space. An avatar 210 of a user moves through a simulated reality environment and is associated with a position in the simulated reality environment at a given time. A set of views associated with a breakpoint may correspond to a region 220 and a central viewing vector 230 and a range of angles. The region 220 is defined in the simulated reality environment.

In this example, the region 220 corresponds to a circle in a plane of the simulated reality environment. For example, to determine whether the avatar 210 has entered the region 220, a position of the avatar in a higher-dimensional virtual space (e.g., a three-dimensional virtual space) may be projected onto the plane of the region 220. Other shapes (not shown in FIG. 2) for the region 220 may be specified, such as a square in a plane, a cylinder, a sphere, a cube, or an irregular shape.

There is a current view from the position of the avatar 210 at a given time that determines what portion of the simulated reality environment will appear in images presented to a user using a head-mounted display. In this example, the view is specified by a viewing vector 240 of the current view. For example, the viewing vector 240 may be parallel to a ray through the center of the view presented to the user. For example, the viewing vector 240 may point from the position of the avatar. For example, the central viewing vector 230 may point from the region 220 toward one or more virtual objects of interest. An angle 250 may be determined between the central viewing vector 230 and the current viewing vector 240 and used to assess whether the view is a member of the set of views associated with the breakpoint.

For example, a breakpoint may be conditioned, in whole or in part, on the view associated with the avatar 210 substantially aligning with the central viewing vector 230 while the avatar 210 is positioned within the region 220 associated with the breakpoint. For example, determining whether the view of the avatar 210 satisfies the condition of the breakpoint may include determining whether the position of the view (e.g., the position of the avatar 210) is within the region 220 of the set of views; determining the angle 250 between the viewing vector 240 of the view and the central viewing vector 230 of the set of views; and determining whether the angle 250 is within a range of angles of the set of views. When this view-based condition is satisfied, the breakpoint may be triggered if the view-based condition is the sole condition for the breakpoint or if the other conditions (e.g., reaching a designated line of code, a condition on the state of a virtual object, or user input) for the breakpoint are also satisfied. Once the breakpoint is triggered, one or more debug actions may be performed, such as pausing execution of a process associated with a virtual object and/or presenting a debug interface to a user controlling the avatar 210 using a head-mounted display.

FIG. 3 is a block diagram of an example of a system 300 configured to enable view-based breakpoints in a simulated reality application. The system 300 includes a processing apparatus 310, a data storage device 320, one or more motion sensors 330, a head-mounted display 340, and an interconnect 370 through which the processing apparatus 310 may access the other components. The system 300 may be configured to enable a view-based breakpoint for software associated with a virtual object in a simulated reality environment of a simulated reality application that is displayed to a user using the head-mounted display 340. For example, the processing apparatus 310 may be configured to run the simulated reality application (e.g., the simulated reality application 500 of FIG. 5). For example, the system 300 may be configured to implement the technique 600 of FIG. 6. For example, the system 300 may be configured to implement the technique 700 of FIG. 7. For example, the system 300 may be configured to implement the technique 800 of FIG. 8. For example, the system 300 may be configured to implement the technique 900 of FIG. 9. For example, the system 300 may be implemented as part of a head-mounted display device (e.g., the head-mounted display worn by the user 110).

The processing apparatus 310 may be operable to execute instructions that have been stored in a data storage device 320. In some implementations, the processing apparatus 310 is a processor with random access memory for temporarily storing instructions read from the data storage device 320 while the instructions are being executed. The processing apparatus 310 may include single or multiple processors, each having single or multiple processing cores. Alternatively, the processing apparatus 310 may include another type of device, or multiple devices, capable of manipulating or processing data. For example, the data storage device 320 may be a non-volatile information storage device such as a hard drive, a solid-state drive, a read-only memory device (ROM), an optical disc, a magnetic disc, or any other suitable type of storage device such as a non-transitory computer readable memory. The data storage device 320 may include another type of device, or multiple devices, capable of storing data for retrieval or processing by the processing apparatus 310. The processing apparatus 310 may access and manipulate data stored in the data storage device 320 via the interconnect 370. For example, the data storage device 320 may store instructions executable by the processing apparatus 310 that upon execution by the processing apparatus 310 cause the processing apparatus 310 to perform operations (e.g., operations that implement the technique 600 of FIG. 6). In some implementations, the processing apparatus 310 and the data storage device 320 are attached to the head-mounted display 340.

The one or more motion sensors 330 may be configured to detect motion of the head-mounted display 340. For example, the one or more motion sensors 330 may include one or more accelerometers, gyroscopes, and/or magnetometers. In some implementations, the one or more motion sensors 330 are attached to the head-mounted display 340. In some implementations, an orientation and/or a position of the head-mounted display 340 in a real space may be determined based at least on sensor data from the one or more motion sensors 330 and/or images from an image sensor (e.g., using visual inertial odometry (VIO)). For example, changes in the orientation and/or a position of the head-mounted display 340 may be used as a control interface for a user to change a view of a simulated reality environment of a simulated reality application that is presented using the head-mounted display 340.

The head-mounted display 340 includes a screen, a lens, or another type of optical assembly configured to direct light to the eyes of a user wearing the head-mounted display 340 to enable the presentation of images (e.g., video frames) to the user. The head-mounted display may be held in place on a face of the user by a fastening article (e.g., a headband or a frame). In some implementations, a screen of the head-mounted display 340 is positioned directly in front of eyes of the user. The screen may be opaque and may obscure the user's view of a surrounding environment. Such a configuration may be used, for example, to provide immersive virtual reality experiences. In some implementations, the head-mounted display 340 includes an optical assembly (e.g., a lens and/or a mirror) that is positioned directly in front of eyes of the user and configured to direct light from a screen or projector of the head-mounted display 340 to the eyes of the user. The optical assembly may also direct light from an environment around the user to eyes of the user. For example, the optical assembly may include a partially reflective polarizing film applied to an inner surface of a transparent visor. The optical assembly may function as an optical combiner. For example, a lens of the optical assembly may also let light from an environment in front of the user pass through to reach eyes of the user and allow the user to see in front of themself while having objects of a simulated reality environment depicted in an image presented by the head-mounted display 340 overlaid on a view of the physical environment in front of the user. In some implementations, a transparency of the optical assembly (e.g., a lens) may be adjusted to suit an application (e.g., a virtual reality application or an augmented reality application).

For example, the interconnect 370 may be a system bus, or a wired or wireless network (e.g., a body area network).

Figure 5:
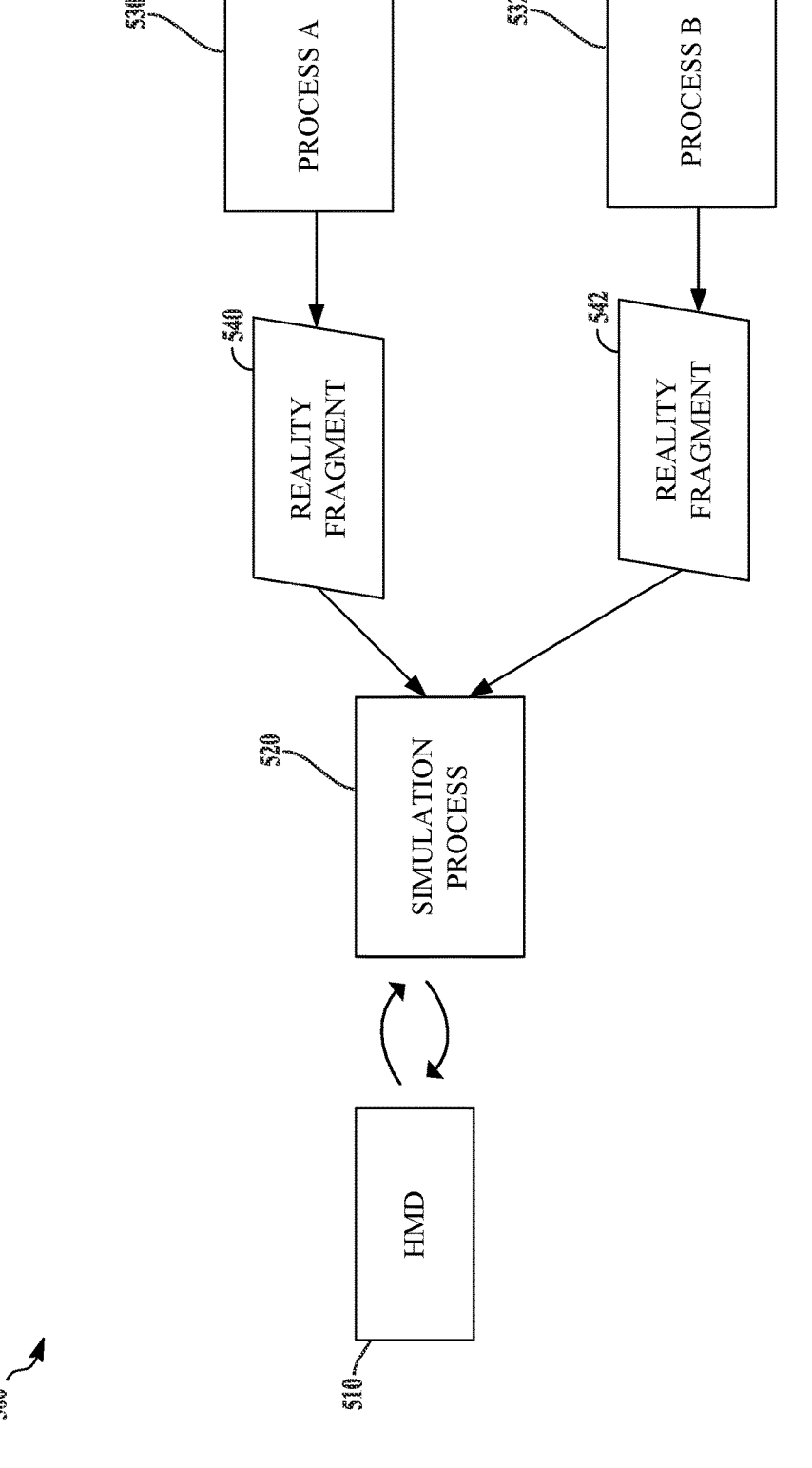
FIG. 5 is a block diagram of an example of a simulated reality application.

The processing apparatus 310 may be configured to enable view-based breakpoints for a simulated reality application (e.g., the simulated reality application 500 of FIG. 5). For example, the processing apparatus 310 may be configured to access motion data captured using the one or more motion sensors 330, and determine, based at least on the motion data, a view within a simulated reality environment presented using the head-mounted display 340. The processing apparatus 310 may be configured to detect that the view is a member of a set of views associated with a breakpoint, and, based at least on the view being a member of the set of views, trigger the breakpoint. For example, the processing apparatus 310 may be configured to, responsive to the breakpoint being triggered, perform a debug action associated with the breakpoint. The processing apparatus 310 may be configured to, while performing the debug action, continue executing a simulation process (e.g., the simulation process 520) of the simulated reality environment to enable a state of at least one virtual object in the simulated reality environment to continue to evolve and be viewed with the head-mounted display 340. In some implementations, the view corresponds to a position within the simulated reality environment and a viewing vector from the position, the set of views corresponds to a region in the simulated reality environment and a range of angles with respect to a central viewing vector, and the processing apparatus 310 is configured to detect that the view is a member of the set of views by determining whether the position of the view is within the region of the set of views; determining an angle between the viewing vector of the view and the central viewing vector of the set of views; and determining whether the angle is within the range of angles of the set of views (e.g., as described in relation to FIG. 2). In some implementations, the view corresponds to a ray within the simulated reality environment, the set of views corresponds to a set of rays that pass through a region in the simulated reality environment, and the processing apparatus 310 is configured to detect that the view is a member of the set of views by determining whether the ray of the view passes through the region of the set of views (e.g., as described in relation to FIG. 1). In some implementations, the view corresponds to a focal point within the simulated reality environment, the set of views corresponds to a region in the simulated reality environment, and the processing apparatus 310 is configured to detect that the view is a member of the set of views by determining whether the focal point of the view is within the region of the set of views. In some implementations, the processing apparatus 310 is configured to, responsive to the breakpoint being triggered, identify one or more objects in the simulated reality environment to be debugged by ray casting based at least on the view. The processing apparatus 310 may be configured to perform the debug action on one or more processes associated with the one or more identified objects.

The breakpoint may have multiple trigger conditions that may be tested and applied together using a logic function (e.g., a logical AND function) to trigger the breakpoint. For example, the breakpoint may have a view-based trigger condition (e.g., as described above) and may have an additional trigger condition, and the breakpoint may be triggered when both the view-based trigger condition and the additional trigger condition are satisfied. For example, the processing apparatus 310 may be configured to trigger the breakpoint based at least on a line of code in a process associated with a virtual object in the simulated reality environment being reached and the view concurrently being associated with the breakpoint. For example, the processing apparatus 310 may be configured to trigger the breakpoint based at least on a condition on a state of a virtual object in the simulated reality environment being met and the view concurrently being associated with the breakpoint. For example, the processing apparatus 310 may be configured to trigger the breakpoint based at least on detecting an action by a user of the head-mounted display 340 and the view concurrently being associated with the breakpoint.

The processing apparatus 310 may be configured to perform one or more debug actions responsive to the breakpoint being triggered in order to provide a variety of debug features. In some implementations, the debug action includes pausing execution of a process associated with a virtual object in the simulated reality environment. For example, the processing apparatus 310 may be configured to generate a visual representation of the object associated with the paused process, and continue to present, using the head-mounted display 340, the visual representation within the simulated reality environment while the process is paused. In some implementations, the debug action includes presenting, using the head-mounted display 340, a debug control interface within the simulated reality environment that enables a user of the head-mounted display 340 to control execution (e.g., at the resolution of lines of code in software) of a process associated with a virtual object in the simulated reality environment. For example, the debug control interface may enable a user to select at least one function from a set of functions consisting of pause, resume, step-into, step-over, and step-out. For example, the debug control interface may include icons that enable a user to issue a step-into command, a step-over command, a step-out command, a continue command, and/or a pause command to control execution of the process associated with the virtual object in the simulated reality environment. In some implementations, the debug action includes presenting, using the head-mounted display 340, within the simulated reality environment, code of a process associated with a virtual object in the simulated reality environment. Presenting a copy of the code (e.g., a syntax color-coded copy of the code) may facilitate debugging of the code by the user wearing the head-mounted display 340. In some implementations, the debug action includes presenting, using the head-mounted display 340, within the simulated reality environment, values of state variables of a process associated with a virtual object in the simulated reality environment. In some implementations, the debug action includes generating a log of one or more parameters of a virtual object in the simulated reality environment.

FIG. 4 is a block diagram of an example of a system 400 configured to enable view-based breakpoints in a simulated reality application. The system 400 includes a head-mounted display 410 and a computing device 450 that communicate via a wireless communications link 425. The head-mounted display 410 includes one or more motion sensors 412, a display 414, a wireless communications interface 416, an interconnect 418 through which components of the head-mounted display may exchange information (e.g., under the control of a microcontroller or other processing apparatus in the head-mounted display 410 (not shown in FIG. 4)), and a fastening article 420 configured to hold the head-mounted display 410 in place on a head of a user that is wearing the head-mounted display 410. The computing device 450 includes a processing apparatus 460, a data storage device 470, a wireless communications interface 480, a user interface 490, and an interconnect 494 through which the processing apparatus 460 may access the other components of the computing device 450. The computing device 450 may be positioned near a user wearing the head-mounted display 410 and may perform computational tasks to control the head-mounted display 410. For example, the computing device 450 may be a smartphone, a tablet, a laptop, a desktop computer, or an appliance (e.g., a smart television or a smart speaker) on a table located in a room with the user, or the computing device 450 may be another wearable device worn on a different body part of the user (e.g., integrated with a vest worn on a chest). The system 400 may be configured to enable view-based breakpoints for a simulated reality application to facilitate debugging by a user wearing the head-mounted display 410. For example, the computing device 450 may be configured to run a simulated reality application (e.g., the simulated reality application 500 of FIG. 5). For example, the system 400 may be configured to implement the technique 600 of FIG. 6. For example, the system 400 may be configured to implement the technique 700 of FIG. 7. For example, the system 400 may be configured to implement the technique 800 of FIG. 8. For example, the system 400 may be configured to implement the technique 900 of FIG. 9.

The head-mounted display 410 includes one or more motion sensors 412. The one or more motion sensors 412 may be configured to detect motion of the head-mounted display 410. For example, the one or more motion sensors 412 may include one or more accelerometers, gyroscopes, and/or magnetometers. The one or more motion sensors 412 may be attached to the head-mounted display 410. In some implementations, an orientation and/or a position of the head-mounted display 410 in a real space may be determined based at least on sensor data from the one or more motion sensors 412 and/or images from an image sensor (e.g., using visual inertial odometry (VIO)). For example, changes in the orientation and/or a position of the head-mounted display 410 may be used as a control interface for a user to change a view of a simulated reality environment of a simulated reality application that is presented using the head-mounted display 410.

The head-mounted display 410 includes a display 414. The display 414 may be configured to present images, converting digital images into light projected from the display 414. The display 414 may project light using an array of pixels that project light in a visible spectrum. The display 414 may include a screen, a lens, or another type of optical assembly configured to direct light to the eyes of a user wearing the head-mounted display 410 to enable the presentation of images (e.g., video frames) to the user. For example, the display 414 may include a screen, such as a liquid crystal display (LCD), a light emitting diode (LED) display (e.g., an OLED display), or other suitable screen. For example, the display 414 may include a projector. In some implementations, a screen of the display 414 is positioned directly in front of eyes of the user. The screen may be opaque and may obscure the user's view of a surrounding environment. Such a configuration may be used, for example, to provide immersive virtual reality experiences. In some implementations, the display 414 includes an optical assembly (e.g., a lens and/or a mirror) that is positioned directly in front of eyes of the user and configured to direct light from a screen or projector of the display 414 to the eyes of the user. The optical assembly may also direct light from an environment around the user to eyes of the user. For example, the optical assembly may include a partially reflective polarizing film applied to an inner surface of a transparent visor. The optical assembly may function as an optical combiner. For example, a lens of the optical assembly may also let light from a physical environment in front of the user pass through to reach eyes of the user and allow the user to see in front of themself while having objects of a simulated reality environment depicted in an image presented by the display 414 overlaid on a view of the physical environment in front of the user. In some implementations, a transparency of the optical assembly (e.g., a lens) may be adjusted to suit a simulated reality application (e.g., a virtual reality application or an augmented reality application).

The head-mounted display 410 includes a wireless communications interface 416. The wireless communications interface 416 facilitates communication with other devices, including the computing device 450. For example, the wireless communications interface 416 may facilitate communication via a Wi-Fi network, a Bluetooth link, or a ZigBee link. In some implementations, the wireless communications interface 416 may be used to receive, from the computing device 450, data and/or instructions invoking presentation using the display 414 of a view of a simulated reality environment. In some implementations, the wireless communications interface 416 may be used to transmit sensor data from the one or more motion sensors 412 to the computing device 450.

For example, the interconnect 418 may be a system bus, or a wired or wireless network (e.g., a body area network).

The head-mounted display 410 includes a fastening article 420. The fastening article 420 may be configured to hold the head-mounted display 410 in place on a head of a user when the user is wearing the head-mounted display 410. For example, the fastening article 420 may include a headband. For example, the fastening article 420 may include a frame with arms that rest on ears of the user and hold a lens or a screen of the display 414 in front of an eye of the user.

The computing device 450 includes a processing apparatus 460. The processing apparatus 460 may be operable to execute instructions that have been stored in a data storage device 470. In some implementations, the processing apparatus 460 is a processor with random access memory for temporarily storing instructions read from the data storage device 470 while the instructions are being executed. The processing apparatus 460 may include single or multiple processors, each having single or multiple processing cores. Alternatively, the processing apparatus 460 may include another type of device, or multiple devices, capable of manipulating or processing data. For example, the data storage device 470 may be a non-volatile information storage device such as a hard drive, a solid-state drive, a read-only memory device (ROM), an optical disc, a magnetic disc, or any other suitable type of storage device such as a non-transitory computer readable memory. The data storage device 470 may include another type of device, or multiple devices, capable of storing data for retrieval or processing by the processing apparatus 460. The processing apparatus 460 may access and manipulate data stored in the data storage device 470 via the interconnect 494. For example, the data storage device 470 may store instructions executable by the processing apparatus 460 that upon execution by the processing apparatus 460 cause the processing apparatus 460 to perform operations (e.g., operations that implement the technique 600 of FIG. 6).

The computing device 450 includes a wireless communications interface 480. The wireless communications interface 480 facilitates communication with other devices, including the head-mounted display 410. For example, the wireless communications interface 480 may facilitate communication via a Wi-Fi network, a Bluetooth link, or a ZigBee link. The wireless communications interface 480 may be used to establish the wireless communications link 425 with the head-mounted display 410. In some implementations, the wireless communications interface 480 may be used to receive sensor data (e.g., motion sensor data) from the head-mounted display 410. In some implementations, the wireless communications interface 480 may be used to transmit, to the head-mounted display 410, data and/or instructions invoking presentation using the display 414 of a view of a simulated reality environment.

The computing device 450 includes a user interface 490. For example, the user interface 490 may include a touchscreen display. For example, the user interface 490 may include a microphone configured to receive speech commands. For example, the user interface 490 may include an image sensor configured to detect hand gesture commands. For example, the user interface 490 may include a keyboard, a mouse, a joystick, and/or another handheld controller. For example, the user interface 490 may enable a user (e.g., the user wearing the head-mounted display 410) to enter commands (e.g., debug commands) to a simulated reality application (e.g., the simulated reality application 500 of FIG. 5) running on the computing device 450 and/or to edit code of process associated with an object of a simulated reality environment of the simulated reality application.

For example, the interconnect 494 may be a system bus, or a wired or wireless network (e.g., a body area network).

The processing apparatus 460 may be configured to enable view-based breakpoints for a simulated reality application (e.g., the simulated reality application 500 of FIG. 5). For example, the processing apparatus 460 may be configured to access motion data captured using the one or more motion sensors 412, and determine, based at least on the motion data, a view within a simulated reality environment presented using the head-mounted display 410. The processing apparatus 460 may be configured to detect that the view is a member of a set of views associated with a breakpoint, and, based at least on the view being a member of the set of views, trigger the breakpoint. For example, the processing apparatus 460 may be configured to, responsive to the breakpoint being triggered, perform a debug action associated with the breakpoint. The processing apparatus 460 may be configured to, while performing the debug action, continue executing a simulation process (e.g., the simulation process 520) of the simulated reality environment to enable a state of at least one virtual object in the simulated reality environment to continue to evolve and be viewed with the head-mounted display 410. In some implementations, the view corresponds to a position within the simulated reality environment and a viewing vector from the position, the set of views corresponds to a region in the simulated reality environment and a range of angles with respect to a central viewing vector, and the processing apparatus 460 is configured to detect that the view is a member of the set of views by determining whether the position of the view is within the region of the set of views; determining an angle between the viewing vector of the view and the central viewing vector of the set of views; and determining whether the angle is within the range of angles of the set of views (e.g., as described in relation to FIG. 2). In some implementations, the view corresponds to a ray within the simulated reality environment, the set of views corresponds to a set of rays that pass through a region in the simulated reality environment, and the processing apparatus 460 is configured to detect that the view is a member of the set of views by determining whether the ray of the view passes through the region of the set of views (e.g., as described in relation to FIG. 1). In some implementations, the view corresponds to a focal point within the simulated reality environment, the set of views corresponds to a region in the simulated reality environment, and the processing apparatus 460 is configured to detect that the view is a member of the set of views by determining whether the focal point of the view is within the region of the set of views. In some implementations, the processing apparatus 460 is configured to, responsive to the breakpoint being triggered, identify one or more objects in the simulated reality environment to be debugged by ray casting based at least on the view. The processing apparatus 460 may be configured to perform the debug action on one or more processes associated with the one or more identified objects.

The breakpoint may have multiple trigger conditions that may be tested and applied together using a logic function (e.g., a logical AND function) to trigger the breakpoint. For example, the breakpoint may have a view-based trigger condition (e.g., as described above) and may have an additional trigger condition, and the breakpoint may be triggered when both the view-based trigger condition and the additional trigger condition are satisfied. For example, the processing apparatus 460 may be configured to trigger the breakpoint based at least on a line of code in a process associated with a virtual object in the simulated reality environment being reached and the view concurrently being associated with the breakpoint. For example, the processing apparatus 460 may be configured to trigger the breakpoint based at least on a condition on a state of a virtual object in the simulated reality environment being met and the view concurrently being associated with the breakpoint. For example, the processing apparatus 460 may be configured to trigger the breakpoint based at least on detecting an action by a user of the head-mounted display 410 and the view concurrently being associated with the breakpoint.

The processing apparatus 460 may be configured to perform one or more debug actions responsive to the breakpoint being triggered in order to provide a variety of debug features. In some implementations, the debug action includes pausing execution of a process associated with a virtual object in the simulated reality environment. For example, the processing apparatus 460 may be configured to generate a visual representation of the object associated with the paused process, and continue to present, using the head-mounted display 410, the visual representation within the simulated reality environment while the process is paused. In some implementations, the debug action includes presenting, using the head-mounted display 410, a debug control interface within the simulated reality environment that enables a user of the head-mounted display 410 to control execution (e.g., at the resolution of lines of code in software) of a process associated with a virtual object in the simulated reality environment. For example, the debug control interface may enable a user to select at least one function from a set of functions consisting of pause, resume, step-into, step-over, and step-out. For example, the debug control interface may include icons that enable a user to issue a step-into command, a step-over command, a step-out command, a continue command, and/or a pause command to control execution of the process associated with the virtual object in the simulated reality environment. In some implementations, the debug action includes presenting, using the head-mounted display 410, within the simulated reality environment, code of a process associated with a virtual object in the simulated reality environment. Presenting a copy of the code (e.g., a syntax color-coded copy of the code) may facilitate debugging of the code by the user wearing the head-mounted display 410. In some implementations, the debug action includes presenting, using the head-mounted display 410, within the simulated reality environment, values of state variables of a process associated with a virtual object in the simulated reality environment. In some implementations, the debug action includes generating a log of one or more parameters of a virtual object in the simulated reality environment.

In some implementations (not shown in FIG. 4), processing for a simulated reality application (e.g., the simulated reality application 500 of FIG. 5) may be distributed between a processing apparatus in the head-mounted display 410 and the processing apparatus 460. For example, a simulation process (e.g., the simulation process 520) may be run on a processing apparatus of the head-mounted display 410 to reduce latency for updates to the view of the simulated reality environment, while one or more processes (e.g., the process A 530 and the process B 532) associated with objects in the simulated reality environment may be run on the processing apparatus 460 to update the states of the objects. In some implementations, reality fragments (e.g., the reality fragment 540 and the reality fragment 542) may be transmitted via the wireless communications link 425 between the head-mounted display 410 and the computing device 450. Thus, the processing apparatus of the head-mounted display 410 and the processing apparatus 460 may operate as a single processing apparatus distributed between the head-mounted display 410 and the computing device 450 that runs the simulated reality application and implements techniques described herein (e.g., the technique 600 of FIG. 6).

FIG. 5 is a block diagram of an example of a simulated reality application 500. The simulated reality application 500 includes multiple processes that together implement a simulated reality environment that a user may view and/or interact with while wearing a head-mounted display 510. The simulated reality application 500 includes a simulation process 520 that coordinates various objects of the simulated reality environment and generates and presents views of the simulated reality environment to the user using the head-mounted display 510. The simulated reality application 500 includes multiple processes associated with objects of the simulated reality environment. In this example, the simulated reality application 500 includes the process A 530, which may be associated with one or more objects (e.g., a bouncing ball), and the process B 532, which may be associated with one or more objects (e.g., an avatar of another user). The process A 530 and the process B 532 may maintain the states of their respective objects. The process A 530 and the process B 532 provide updates of the states of their respective objects to the simulation process 520 as a reality fragment 540 and a reality fragment 542. The simulation process 520 may then present the updated objects to the user using the head-mounted display 510.

For example, the head-mounted display 510 may include the head-mounted display 340 or the head-mounted display 410.

The simulation process 520 may include one or more threads. For example, the simulation process 520 may implement a physics engine that determines how objects in the simulated reality environment interact with one another. The simulation process 520 may receive updated state information for objects of the simulated reality environment from processes corresponding to those objects in the form of reality fragments (e.g., the reality fragment 540 and the reality fragment 542). For example, the reality fragment 540 and the reality fragment 542 may be passed to the simulation process 520 via an inter-process interface. The simulation process 520 may receive motion data from the head-mounted display 510 and may update a view based at least on the motion data. The simulation process 520 may render the view of the simulated reality environment as one or more images (e.g., an image for a left eye of the user and an image for a right eye of the user) that may be passed to the head-mounted display 510 for presentation to the user. For example, the rendered images for the view may be transferred to the head-mounted display 510 via an interconnect (e.g., the interconnect 370). For example, the rendered images for the view may be transferred to the head-mounted display 510 via a wireless communications link (e.g., the wireless communications link 425).

The process A 530 may include one or more threads. The process A 530 may maintain and update the state of a virtual object (e.g., a virtual book or a virtual bouncing ball). The process B 532 may include one or more threads. The process B 532 may maintain and update the state of a virtual object (e.g., a virtual phone or an avatar for another user). In some usage scenarios, when a breakpoint for the process A 530 is triggered, the process A 530 is paused and a new process (not shown in FIG. 5) is spawned to provide a debug control interface for the process A 530 as a new virtual object in the simulated reality environment. The process B 532 may continue to execute normally while the process A 530 is being debugged following the triggering of the breakpoint. The simulation process 520 also continues to be executed to present the simulated reality environment to the user using the head-mounted display 510. The user may be enabled to debug the process A 530 from within the simulated reality environment while retaining the option to continue interacting with other objects in the simulated reality environment that may be helpful, such as an avatar of another user.

FIG. 6 is a flowchart of an example of a technique 600 for enabling a view-based breakpoint. The technique 600 includes accessing 610 motion data captured using one or more motion sensors; determining 620, based at least on the motion data, a view within a simulated reality environment presented using a head-mounted display; detecting 630 that the view is associated with a breakpoint; based at least on the view being associated with a breakpoint, triggering 640 the breakpoint; responsive to the breakpoint being triggered, performing 650 a debug action associated with the breakpoint; and, while performing the debug action, continuing 660 to execute a simulation process of the simulated reality environment to enable a state of at least one virtual object in the simulated reality environment to continue to evolve and be viewed with the head-mounted display. For example, the technique 600 may be implemented by the system 300 of FIG. 3. For example, the technique 600 may be implemented by the system 400 of FIG. 4.

The technique 600 includes accessing 610 motion data captured using one or more motion sensors (e.g., the one or more motion sensors 330 or the one or more motion sensors 412). For example, the one or more motion sensors may include one or more accelerometers, gyroscopes, and/or magnetometers. In some implementations, the one or more motion sensors are attached to a head-mounted display (e.g., the head-mounted display 340 or the head-mounted display 410). In some implementations, an orientation and/or a position of the head-mounted display in a real space may be determined based at least on sensor data from the one or more motion sensors. The motion data may be accessed 610 in a variety of ways. For example, the sensor data may be accessed 610 by reading directly from a sensor or from a memory via an interconnect (e.g., the interconnect 370). For example, the sensor data may be accessed 610 by receiving sensor data via a communications link (e.g., the wireless communications link 425).

The technique 600 includes determining 620, based at least on the motion data, a view within a simulated reality environment presented using a head-mounted display (e.g., the head-mounted display 340 or the head-mounted display 410). For example, when a user wearing the head-mounted display turns their head, the view of the simulated reality environment may be rotated by a corresponding amount within the simulated reality environment. For example, when a user wearing the head-mounted display walks, the view of the simulated reality environment may be shifted by making a corresponding change to a position of the view (e.g., a position of an avatar of the user) in the simulated reality environment (e.g., a simulated reality environment of an augmented reality application that is overlaid on a physical environment). In some implementations, other inputs may also be used to change the view of the simulated reality environment. For example, joystick or mouse input may cause the position of an avatar and a corresponding view to be changed (e.g., changing the position of a virtual camera for the view), while the motion data may be used to change an orientation of the view (e.g., changing the orientation of a virtual camera for the view). For example, image data may be used with the motion data to determine 620 the view (e.g., by determining a pose of the display device using visual inertial odometry (VIO)).

The technique 600 includes detecting 630 whether the view is associated with a breakpoint. For example, detecting 630 whether the view is associated with the breakpoint may include detecting 630 that the view is a member of a set of views associated with a breakpoint. The view being a member of the set of views associated with the breakpoint may be a view-based trigger condition for the breakpoint. The set of views associated with the breakpoint may be specified in numerous ways. In some implementations, the set of views corresponds to a region in the simulated reality environment and a range of angles with respect to a central viewing vector (e.g., as described in relation to the usage scenario 200 of FIG. 2). For example, the technique 700 of FIG. 7 may be implemented to detect 630 that the view is a member of the set of views. In some implementations, the view corresponds to a ray within the simulated reality environment (e.g., a ray from a current position of an avatar or virtual camera), the set of views corresponds to a set of rays that pass through a region (e.g., the region 140) in the simulated reality environment, and detecting 630 that the view is a member of the set of views includes determining whether the ray of the view passes through the region of the set of views (e.g., as described in relation to the usage scenario 100 of FIG. 1). In some implementations, the view corresponds to a focal point within the simulated reality environment, the set of views corresponds to a region in the simulated reality environment, and detecting 630 that the view is a member of the set of views includes determining whether the focal point of the view is within the region of the set of views.

The technique 600 includes, based at least on the view being associated with the breakpoint (e.g., based at least on the view being a member of the set of views associated with the breakpoint), triggering 640 the breakpoint. The breakpoint may be associated with one or more triggering conditions, including the view being a member of the set of views. In some implementations, the view being a member of the set of views is the only triggering condition associated with the breakpoint. In some implementations, the view being a member of the set of views may be one of multiple trigger conditions for the breakpoint. Where the breakpoint has multiple trigger conditions, the trigger conditions may be tested and applied together using a logic function (e.g., a logical AND function) to trigger the breakpoint. For example, the breakpoint may be triggered when both a view-based trigger condition and an additional trigger condition are satisfied. For example, triggering 640 the breakpoint may include triggering the breakpoint based at least on a line of code in a process (e.g., the process A 530) associated with an object (e.g., a bouncing ball) in the simulated reality environment being reached and the view concurrently being associated with the breakpoint. For example, conditioning on reaching a line of code and the view may help a user to investigate the performance of certain code sections of a process associated with an object during particular viewing scenarios. For example, triggering 640 the breakpoint may include triggering the breakpoint based at least on a condition on a state of a virtual object in the simulated reality environment being met and the view concurrently being associated with the breakpoint. For example, triggering 640 the breakpoint may include triggering the breakpoint based at least on detecting an action (e.g., a hand gesture or a button press input via the user interface 490) by a user of the head-mounted display and the view concurrently being associated with the breakpoint.

The technique 600 includes, responsive to the breakpoint being triggered, performing 650 a debug action associated with the breakpoint. For example, the debug action may include pausing execution of a process (e.g., the process A 530) associated with a virtual object in the simulated reality environment and/or presenting a debug control interface to the user using the head-mounted display to facilitate debugging of the process. One or more debug actions may be performed 650 responsive to the breakpoint being triggered in order to provide a variety of debug features. For example, various combinations of the actions described in relation to the technique 800 of FIG. 8 may be implemented to perform 650 the debug action.

The technique 600 includes, while performing 650 the debug action, continuing 660 to execute a simulation process (e.g., the simulation process 520) of the simulated reality environment to enable a state of at least one virtual object in the simulated reality environment to continue to evolve and be viewed with the head-mounted display. For example, a user may be enabled to independently debug a process associated with a particular object of interest within the simulated reality environment, while continuing to use the simulated reality environment provided by a simulated reality application to view and/or interact with other objects (e.g., an avatar for another user) in the simulated reality environment. For example, the debug action may include pausing execution of a process (e.g., the process A 530) associated with an object (e.g., a bouncing ball) in the simulated reality environment, and, while the process is paused for debugging, other processes (e.g., the process B 532) for other objects (e.g., an avatar) may continue to run, enabling continued interactions with those other objects.

Figure 7:
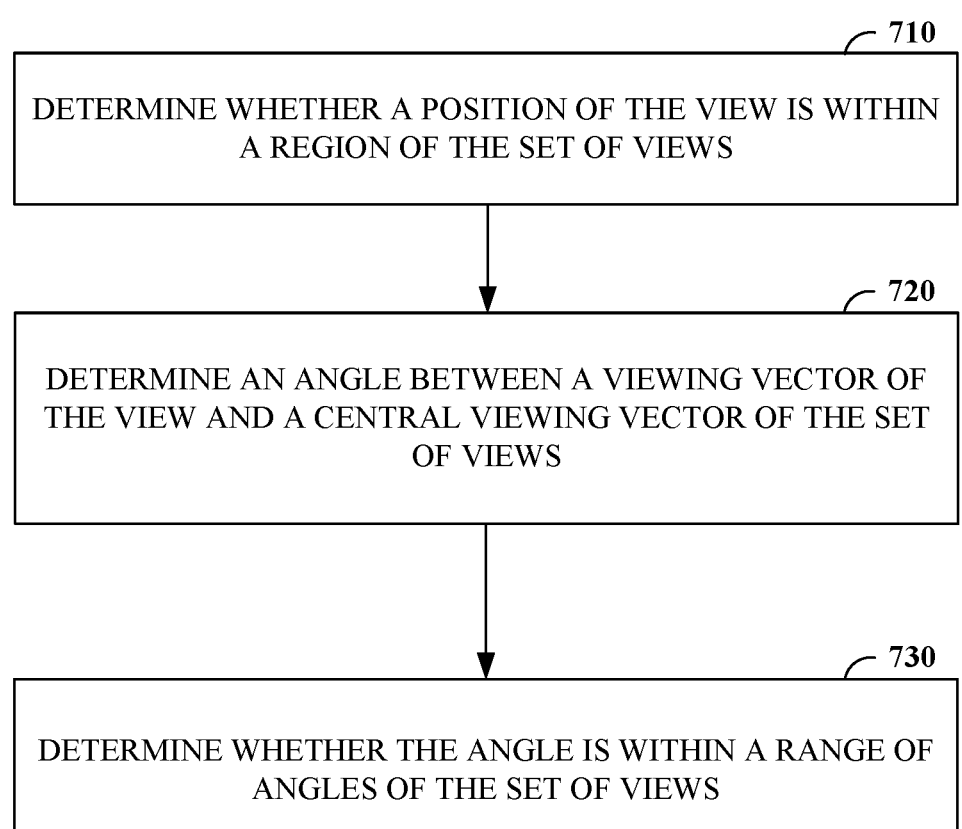
FIG. 7 is a flowchart of an example of a technique for detecting that a view is a member of a set of views associated with a breakpoint.

FIG. 7 is a flowchart of an example of a technique 700 for detecting that a view is a member of a set of views associated with a breakpoint. The view may be specified as a position within the simulated reality environment and a viewing vector from the position. The set of views may correspond to as a region in the simulated reality environment and a range of angles with respect to a central viewing vector. The technique 700 includes determining 710 whether a position of the view is within a region of the set of views; determining 720 an angle between the viewing vector of the view and the central viewing vector of the set of views; and determining 730 whether the angle is within a range of angles of the set of views. For example, the technique 700 may be implemented by the system 300 of FIG. 3. For example, the technique 700 may be implemented by the system 400 of FIG. 4.

The technique 700 includes determining 710 whether the position of the view is within the region of the set of views. For example, the position of the view may correspond to a position of an avatar of a user wearing a head-mounted display and/or to the position of a virtual camera associated with the user. The position of the view may correspond to coordinates of a point in the simulated reality environment (e.g., a simulated reality environment that is a three-dimensional space). In some implementations, determining 710 whether the position of the view is within the region of the set of views includes checking whether the intersection of the position of the view with the region of the set of views is non-empty. In some implementations, determining 710 whether the position of the view is within the region of the set of views includes projecting the position of the view onto a lower-dimensional subspace and checking for whether the intersection of the projection of the position of the view with the region of the set of views is non-empty. For example, a three-dimensional position may be projected onto two-dimensional plane (e.g., a virtual floor) on which a region of the set of views is specified (e.g., as described in relation to the usage scenario 200 of FIG. 2).

The technique 700 includes determining 720 an angle between the viewing vector of the view and the central viewing vector of the set of views. For example, the viewing vector may be parallel to a ray through the center of the view presented to the user using a head-mounted display. For example, the viewing vector may point from the position of the view. For example, the central viewing vector may point from the region of the set of views toward one or more virtual objects of interest. The technique 700 includes determining 730 whether the angle is within the range of angles of the set of views. For example, if the magnitude of the angle is less than a threshold, then the angle may be within the range of angles of the set of views. In some implementations, the two angles between the viewing vector and the central viewing vector of the set of views may be determined 720 and evaluated. For example, a pitch rotation and a yaw rotation between the two vectors may be determined 720, and the magnitude of the pitch angle may be compared to a first threshold and the magnitude of the yaw angle may be compared to a second threshold that may be different from the first threshold. For example, if the position of the view is within the region and the angle is within the range of angles, then the view is detected as a member of the set of views associated with the breakpoint.

FIG. 8 is a flowchart of an example of a technique 800 for performing debug actions responsive to a breakpoint being triggered. The technique 800 includes pausing 810 execution of a process associated with a virtual object in the simulated reality environment; generating 820 a visual representation of the object associated with the paused process; continuing to present 830, using the head-mounted display, the visual representation within the simulated reality environment while the process is paused; presenting 840, using the head-mounted display, a debug control interface within the simulated reality environment; presenting 850, using the head-mounted display, within the simulated reality environment, code of a process associated with a virtual object in the simulated reality environment; presenting 860, using the head-mounted display, within the simulated reality environment, values of state variables of a process associated with a virtual object in the simulated reality environment; and generating 870 a log of one or more parameters of a virtual object in the simulated reality environment. For example, the technique 800 may be implemented by the system 300 of FIG. 3. For example, the technique 800 may be implemented by the system 400 of FIG. 4.

The technique 800 includes pausing 810 execution of a process associated with a virtual object in the simulated reality environment. A state of the object may stop evolving while the associated process is paused 810. Pausing 810 execution of the process for the object may enable a user (e.g., a software developer) wearing a head-mounted display (e.g., the head-mounted display 410) to examine the code and/or state variables of the process. For example, the process A 530 may be paused 810 to facilitate debugging of the process A 530.

The technique 800 includes generating 820 a visual representation of the object associated with the paused process (e.g., the process A 530). For example, a simulation process (e.g., the simulation process 520) for the simulated reality environment may generate 820 the visual representation of the object (e.g., a bouncing ball paused in mid-air) based at least on the latest available state information for the object (e.g., as encoded in the reality fragment 540) at the time the process is paused 810. The technique 800 includes continuing to present 830, using the head-mounted display (e.g., the head-mounted display 340 or the head-mounted display 410), the visual representation within the simulated reality environment while the process is paused 810.

The technique 800 includes presenting 840, using the head-mounted display (e.g., the head-mounted display 340 or the head-mounted display 410), a debug control interface within the simulated reality environment that enables a user of the head-mounted display to control execution (e.g., at the resolution of lines of code in software) of a process (e.g., the process A 530) associated with a virtual object in the simulated reality environment. For example, the debug control interface may enable a user to select at least one function from a set of functions consisting of pause, resume, step-into, step-over, and step-out. For example, the debug control interface may include icons that enable a user to issue a step-into command, a step-over command, a step-out command, a continue command, and/or a pause command to control execution of the process associated with the virtual object in the simulated reality environment. In some implementations, the debug control interface may be spawned as a new virtual object in the simulated reality environment with an associated process configured to manage a debug session for another process that is being debugged. In this example, the process that is paused 810 is being debugged.

The technique 800 includes presenting 850, using the head-mounted display, within the simulated reality environment, code of a process (e.g., the process A 530) associated with a virtual object in the simulated reality environment. For example, the copy of the code presented 850 may be a syntax color-coded copy of the code, which may facilitate debugging of the code by the user wearing the head-mounted display. In some implementations, the code may be presented 850 in a portion of the debug control interface that is presented 840 for the process that is paused 810.

The technique 800 includes presenting 860, using the head-mounted display, within the simulated reality environment, values of state variables of a process (e.g., the process A 530) associated with a virtual object in the simulated reality environment. In some implementations, the values of state variables may be presented 860 in a portion of the debug control interface that is presented 840 for the process that is paused 810.

The technique 800 includes generating 870 a log of one or more parameters (e.g., outputs or internal state variables) of a virtual object in the simulated reality environment. For example, the log may record a time history of the one or more parameters, and entries in the log may include respective time stamps. For example, the log may be written to memory of the processing apparatus 310 and/or written to the data storage device 320. In some implementations, all or a portion (e.g., the most recent N entries) of the log may be presented, using the head-mounted display, within the simulated reality environment. In some implementations, the log entries may be presented in a portion of the debug control interface that is presented 840 for the process that is paused 810.

FIG. 9 is a flowchart of an example of a technique 900 for identifying one or more virtual objects to debug responsive to a breakpoint being triggered. For example, the one or more objects to debug may be selected based at least on the view at the time the breakpoint is triggered. The technique 900 includes, responsive to the breakpoint being triggered, identifying 910 one or more objects in the simulated reality environment to be debugged by ray casting based at least on the view; and performing 920 the debug action on one or more processes associated with the one or more identified objects. For example, the technique 900 may be implemented by the system 300 of FIG. 3. For example, the technique 900 may be implemented by the system 400 of FIG. 4.

The technique 900 includes, responsive to the breakpoint being triggered, identifying 910 one or more objects in the simulated reality environment to be debugged by ray casting based at least on the view. For example, a ray projecting through the center of the view presented to the user using a head-mounted display may be used for ray casting to identify 910 the one or more objects to be debugged. If the ray is incident on a virtual object in the simulated reality environment, then the object may be identified 910 for debugging. In some implementations, only the closest object that the ray intersects is identified 910. In some implementations, multiple objects that the ray passes through are identified 910. In some implementations, multiple rays derived from the view are cast to identify 910 the one or more objects for debugging. In some implementations, gaze detection to identify 910 an object being looked at by the user.

The technique 900 includes performing 920 a debug action on one or more processes associated with the one or more identified 910 objects. For example, the technique 800 of FIG. 8 may be implemented to perform 920 the debug action on a process associated with one or more of the objects that have been identified 910. Other combinations of debug actions may be performed for such a process. In some implementations, performing 920 a debug action includes spawning a separate debugger process for each process associated with an object that has been identified 910.

In a fifth aspect, the subject matter described in this specification can be embodied in systems that include a display and one or more motion sensors attached to the display. The systems include a processing apparatus configured to associate a breakpoint with a set of views that corresponds to a region in a simulated reality environment presented using the display; access motion data captured using the one or more motion sensors; determine, based at least on the motion data, a view within the simulated reality environment, wherein the view is stored as a viewing vector from a position in the simulated reality environment; based on the stored viewing vector, detect whether the view is a member of the set of views associated with the breakpoint; responsive to detecting that the view is a member of the set of views associated with the breakpoint, trigger the breakpoint and perform a debug action associated with the breakpoint; while performing the debug action, continue executing a simulation process of the simulated reality environment, wherein a state of at least one virtual object in the simulated reality environment continues to be viewed with the display and continues to respond to input received using the one or more motion sensors; and wherein the processing apparatus is configured to detect that the view is associated with the breakpoint by determining an angle between the viewing vector from the position in the simulated reality environment and a central viewing vector.

In a sixth aspect, the subject matter described in this specification can be embodied in methods that include associating a breakpoint with a set of views that corresponds to a region in a simulated reality environment presented using a display; accessing motion data captured using one or more motion sensors; determining, based at least on the motion data, a view within the simulated reality environment, wherein the view is stored as a viewing vector from a position in the simulated reality environment; based on the stored viewing vector, detecting whether the view is a member of the set of views associated with the breakpoint; responsive to detecting that the view is a member of the set of views associated with the breakpoint, triggering the breakpoint; responsive to the breakpoint being triggered, performing a debug action associated with the breakpoint; while performing the debug action, continuing to execute a simulation process of the simulated reality environment, wherein a state of at least one virtual object in the simulated reality environment continues to evolve and be viewed with the display and continues to respond to input received using the one or more motion sensors; and wherein detecting that the view is associated with the breakpoint comprises: determining an angle between the viewing vector from the position in the simulated reality environment and a central viewing vector.

The techniques described herein (e.g., the technique 600 of FIG. 6) may be used for simulated reality applications that are presented using a variety of display hardware. For example, the display used to present a simulated reality environment as described herein may be part of head-mounted display, a smartphone, or a tablet running the simulated reality application.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time.

Some implementations may collect and/or use data to facilitate debugging of simulated reality applications. It is possible that this data may include personal information that identifies a specific person. Examples of personal information include names, dates of birth, addresses, telephone numbers, locations, social media usernames or other account usernames, and/or physiological information.

In some implementations, use of this type of information can be beneficial to enhance use of the systems and methods that are described herein. For example, personal information can be used to recognize locations in a real environment to enhance operation and debugging of augmented reality applications.

Well-established policies and practices should be used by those that collect, receive, transmit and/or use personal information. For example, industry standard practices and protections should be met and exceeded to keep such information secure. Users should be made aware of these policies and procedures both prior to collection and use of information and whenever the policies and procedures change. Access to this information should be limited to protect against improper use and accidental disclosure. Those that collect, receive, transmit and/or use personal information must also comply with all laws and regulations in the relevant jurisdictions, recognizing that these laws and regulations will vary from country to country.

The systems and methods herein can allow users to limit or block use of personal information, such as by "opt in" or "opt out" type systems. These options can be provided to users such that separate control is afforded over uses of different types of information. Thus, different permitted or prohibited usages can be specified for location data and for user identification information.

Steps should be taken to counter the risks of unauthorized disclosure or use. Examples include limiting data collection, limiting the time period during which information is kept, and deleting data that is not needed. In addition, some types of personal information can be anonymized or stored in a form that aggregates data across users without linking that information to specific users.

In addition, although personal information can be used in the systems and methods herein, personal information is not required for any implementation, and its use can be eliminated. For example, views in some simulated reality environments can be determined without geolocation data based on non-personal information data or a bare minimum amount of personal information.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. A system comprising:
a display;
one or more motion sensors attached to the display; and
a processing apparatus configured to:
    associate a breakpoint with a set of views that corresponds to a region in a simulated reality environment presented using the display;
    access motion data captured using the one or more motion sensors;
    determine, based at least on the motion data, a view within the simulated reality environment, wherein the view is stored as a viewing vector from a position in the simulated reality environment;
    based on the stored viewing vector, detect whether the view is a member of the set of views associated with the breakpoint;
    responsive to detecting that the view is a member of the set of views associated with the breakpoint, trigger the breakpoint and perform a debug action associated with the breakpoint;
    while performing the debug action, continue executing a simulation process of the simulated reality environment, wherein a state of at least one virtual object in the simulated reality environment continues to be viewed with the display and continues to respond to input received using the one or more motion sensors; and
    wherein the processing apparatus is configured to detect that the view is associated with the breakpoint by determining an angle between the viewing vector from the position in the simulated reality environment and a central viewing vector.

2. The system of claim 1, wherein the set of views corresponds to a range of angles with respect to the central viewing vector, and the processing apparatus is configured to detect that the view is associated with the breakpoint by:
    determining whether the position in the simulated reality environment is within the region in the simulated reality environment;
    and
    determining whether the angle is within the range of angles.

3. The system of claim 1, wherein the view corresponds to a ray within the simulated reality environment, the set of views corresponds to a set of rays that pass through the region in the simulated reality environment, and the processing apparatus is configured to detect that the view is associated with the breakpoint by:
    determining whether the ray of the view passes through the region of the set of views.

4. The system of claim 1, wherein the view corresponds to a focal point within the simulated reality environment, and the processing apparatus is configured to detect that the view is associated with the breakpoint by:
    determining whether the focal point of the view is within the region corresponding to the set of views.

5. The system of claim 1, wherein the breakpoint has multiple trigger conditions and the processing apparatus is configured to:
    trigger the breakpoint based at least on a line of code in a process associated with a virtual object in the simulated reality environment being reached and the view concurrently being associated with the breakpoint.

6. The system of claim 1, wherein the breakpoint has multiple trigger conditions and the processing apparatus is configured to:

trigger the breakpoint based at least on a condition on a state of a virtual object in the simulated reality environment being met and the view concurrently being associated with the breakpoint.

7. The system of claim 1, wherein the breakpoint has multiple trigger conditions and the processing apparatus is configured to:

trigger the breakpoint based at least on detecting an action by a user of the display and the view concurrently being associated with the breakpoint.

8. The system of claim 1, wherein the processing apparatus is configured to:

responsive to the breakpoint being triggered, identify one or more objects in the simulated reality environment to be debugged by ray casting based at least on the view; and perform the debug action on one or more processes associated with the one or more identified objects.

9. The system of claim 1, wherein the debug action includes pausing execution of a process associated with a virtual object in the simulated reality environment.

10. The system of claim 9, wherein the processing apparatus is configured to:

generate a visual representation of the object associated with the paused process; and continue to present, using the display, the visual representation within the simulated reality environment while the process is paused.

11. The system of claim 1, wherein the debug action includes presenting, using the display, a debug control interface within the simulated reality environment that enables a user of the display to control execution of a process associated with a virtual object in the simulated reality environment.

12. The system of claim 1, wherein the debug action includes presenting, using the display, within the simulated reality environment, code of a process associated with a virtual object in the simulated reality environment.

13. The system of claim 1, wherein the display is a head-mounted display.

14. A method comprising:

associating a breakpoint with a set of views that corresponds to a region in a simulated reality environment presented using a display;

accessing motion data captured using one or more motion sensors;

determining, based at least on the motion data, a view within the simulated reality environment, wherein the view is stored as a viewing vector from a position in the simulated reality environment;

based on the stored viewing vector, detecting whether the view is a member of the set of views associated with the breakpoint;

responsive to detecting that the view is a member of the set of views associated with the breakpoint, triggering the breakpoint;

responsive to the breakpoint being triggered, performing a debug action associated with the breakpoint;

while performing the debug action, continuing to execute a simulation process of the simulated reality environment, wherein a state of at least one virtual object in the simulated reality environment continues to evolve and be viewed with the display and continues to respond to input received using the one or more motion sensors; and wherein detecting that the view is associated with the breakpoint comprises: determining an angle between the viewing vector from the position in the simulated reality environment and a central viewing vector.

15. The method of claim 14, wherein the set of views corresponds to a range of angles with respect to the central viewing vector, and detecting that the view is associated with the breakpoint comprises:

determining whether the position in the simulated reality environment is within the region in the simulated reality environment;

determining whether the angle is within the range of angles.

16. The method of claim 14, wherein the view corresponds to a ray within the simulated reality environment, the set of views corresponds to a set of rays that pass through the region in the simulated reality environment, and detecting that the view is associated with the breakpoint comprises:

determining whether the ray of the view passes through the region of the set of views.

17. The method of claim 14, wherein the view corresponds to a focal point within the simulated reality environment, and detecting that the view is associated with the breakpoint comprises:

determining whether the focal point of the view is within the region corresponding to the set of views.

18. The method of claim 14, comprising:

triggering the breakpoint based at least on a line of code in a process associated with a virtual object in the simulated reality environment being reached and the view concurrently being associated with the breakpoint.

19. The method of claim 14, comprising:

responsive to the breakpoint being triggered, identifying one or more objects in the simulated reality environment to be debugged by ray casting based at least on the view; and performing the debug action on one or more processes associated with the one or more identified objects.

20. The method of claim 14, wherein the debug action includes pausing execution of a process associated with a virtual object in the simulated reality environment.

* * * * *